(12) United States Patent
Nohara et al.

(10) Patent No.: US 10,036,447 B2
(45) Date of Patent: Jul. 31, 2018

(54) STABILIZER AND SHIP

(71) Applicant: TOHMEI INDUSTRIES CO., LTD., Aichi (JP)

(72) Inventors: Tsuyoshi Nohara, Tokyo (JP); Takashi Miura, Tokyo (JP); Hiroshi Takeuchi, Tokyo (JP); Katsuya Umemura, Tokyo (JP)

(73) Assignee: TOHMEI INDUSTRIES CO., LTD., Aichi (JP)

( * ) Notice: Subject to any disclaimer, the term of this patent is extended or adjusted under 35 U.S.C. 154(b) by 0 days.

(21) Appl. No.: 15/542,563

(22) PCT Filed: Oct. 20, 2015

(86) PCT No.: PCT/JP2015/079561
§ 371 (c)(1),
(2) Date: Jul. 10, 2017

(87) PCT Pub. No.: WO2017/006498
PCT Pub. Date: Jan. 12, 2017

(65) Prior Publication Data
US 2017/0370443 A1    Dec. 28, 2017

(30) Foreign Application Priority Data

Jul. 7, 2015   (JP) .................. 2015-136531

(51) Int. Cl.
*F16F 15/12* (2006.01)
*B63B 39/04* (2006.01)
(Continued)

(52) U.S. Cl.
CPC .......... *F16F 15/129* (2013.01); *B63B 39/005* (2013.01); *B63B 39/04* (2013.01);
(Continued)

(58) Field of Classification Search
CPC .......... B63B 1/00; B63B 39/00; B63B 39/04; B63B 43/06; B63B 43/08; B63B 9/08; G01C 19/02; G01C 19/04
(Continued)

(56) References Cited

U.S. PATENT DOCUMENTS 5,628,267 A * 5/1997 Hoshio .................. B63B 39/04
114/122
5,839,386 A * 11/1998 Frieling .................. B63B 39/04
114/121
(Continued)

FOREIGN PATENT DOCUMENTS

JP    7-127685    5/1995
JP    10-86891    4/1998
(Continued)

OTHER PUBLICATIONS

International Search Report dated Nov. 17, 2015 in International Application No. PCT/JP2015/079561.
(Continued)

*Primary Examiner* — Lars A Olson
(74) *Attorney, Agent, or Firm* — Wenderoth, Lind & Ponack, L.L.P.

(57) ABSTRACT

A stabilizer (10) includes a base (20) fixed on a motion reduction target (1); a gimbal (40) supported by the base to be rotatable around a first axis (RA); a damper mechanism (30) disposed to damp a relative rotary motion of the gimbal (40) to the base (20); a flywheel (50) disposed to be rotatable around a second axis (RB) orthogonal to the first axis (RA). The damper mechanism (30) is a passive-type damper mechanism. A first value (D1) of a damping coefficient (D) of the damper mechanism (30) when an angular velocity of the gimbal (40) is a first angular velocity is larger than a second value (D2) of the damping coefficient (D) of the damper mechanism (30) when the angular velocity of the
(Continued)

gimbal (40) is a second angular velocity smaller than the first angular velocity.

8 Claims, 7 Drawing Sheets

(51) Int. Cl.
    *F16F 15/129*     (2006.01)
    *B63B 39/00*     (2006.01)
    *F16F 15/16*     (2006.01)
    *F16F 9/14*     (2006.01)

(52) U.S. Cl.
    CPC .......... *F16F 15/16* (2013.01); *B60G 2202/22* (2013.01); *F16F 9/145* (2013.01)

(58) Field of Classification Search
    USPC .................................................. 114/121, 122
    See application file for complete search history.

(56) References Cited

U.S. PATENT DOCUMENTS

| | | | | |
|---|---|---|---|---|
| 6,619,221 | B2 * | 9/2003 | Umemura | ............... B63B 39/04 |
| | | | | 114/121 |
| 6,973,847 | B2 * | 12/2005 | Adams | .................... B63B 39/04 |
| | | | | 114/121 |
| 7,240,630 | B2 * | 7/2007 | Akers | .................... B63B 39/04 |
| | | | | 114/122 |
| 2003/0029367 | A1 | 2/2003 | Umemura et al. | |
| 2014/0245939 | A1 * | 9/2014 | Nohara | .................... B63B 39/04 |
| | | | | 114/121 |

FOREIGN PATENT DOCUMENTS

| | | |
|---|---|---|
| JP | 10-246636 | 9/1998 |
| JP | 2000-249042 | 9/2000 |
| JP | 2003-54491 | 2/2003 |
| JP | 2005-41416 | 2/2005 |
| JP | 2005-113934 | 4/2005 |
| JP | 5646066 | 12/2014 |
| NZ | 518132 | 8/2003 |

OTHER PUBLICATIONS

International Preliminary Report on Patentability dated Jan. 18, 2018 in International Application No. PCT/JP2015/079561.

First Examination Report dated May 28, 2018 in New Zealand Application No. 733373.

Elliott et al., "Nonlinear damping and quasi-linear modelling", Philosophical Transactions A, 373:1-29 (2014).

* cited by examiner

STABILIZER AND SHIP

TECHNICAL FIELD

The present invention relates to a stabilizer, and especially, to a stabilizer which restrains a motion of a ship, and a ship in which the stabilizer is installed.

BACKGROUND ART

A stabilizer which restrains a motion of a ship is known.

As the related techniques, Patent Literature 1 discloses a stabilizer for achieving an optimal motion damping effect. In the stabilizer described in Patent Literature 1, a spring or a brake is used as a mechanism to damp the rotary motion of a gimbal. Also, in the stabilizer described in Patent Literature 1, a predetermined distance (deviation) exists between the center of gravity of the whole gimbal and the rotation axis of the gimbal. By controlling the distance (deviation), the control of a parameter which is equivalent to a spring constant is carried out.

Also, a motion reducing apparatus is described in Patent Literature 2. In the motion reducing apparatus described in Patent Literature 2, an angular velocity of the gimbal is detected by an angular velocity sensor. A control unit controls an excitation electric current supplied to an electromagnetic brake according to the angular velocity of the gimbal. By the control of the excitation electric current, the angular velocity of the gimbal is controlled.

Also, a stabilizer is described in Patent Literature 3. In the stabilizer described in Patent Literature 3, an oil type damper is used as a mechanism to damp the rotary motion of the gimbal.

CITATION LIST

Patent Literature

[Patent literature 1] JP H10-246636A
[Patent literature 2] JP H07-127685A
[Patent literature 3] JP 2003-054491A

SUMMARY OF THE INVENTION

An object of the present invention is to provide a stabilizer having a passive-type damper which can damp a motion even when a swing motion angular velocity of a motion reduction target is small.

This object of the present invention and other objects are possible to confirm easily in the following description and the attached drawings.

The stabilizer according to some embodiments includes a base fixed on a motion reduction target; a gimbal supported by the base to be rotatable around a first axis; a damper mechanism disposed to damp a relative rotary motion of the gimbal to the base; a flywheel configuring a part of the gimbal and disposed to be rotatable around a second axis orthogonal to the first axis; and a motor configured to rotate the flywheel. The damper mechanism is a passive-type damper mechanism. A first value of a damping coefficient of the damper mechanism when an angular velocity of the gimbal is a first angular velocity is larger than a second value of the damping coefficient of the damper mechanism when the angular velocity of the gimbal is a second angular velocity smaller than the first angular velocity.

By the present invention, the stabilizer can be provided which includes the passive-type damper which can suitably damp the motion even when the swing motion angular velocity of the motion reduction target is small.

BRIEF DESCRIPTION OF THE DRAWINGS

The attached drawings are incorporated into this Specification to assist the description of embodiments. Note that the drawings should not be interpreted to limit the present invention to illustrated examples and the described embodiments.

DESCRIPTION OF THE EMBODIMENTS

In the following detailed description, many detailed specific matters are disclosed for the purpose of explanation, to provide the comprehensive understanding of the embodiments. However, it would be apparent that one or more embodiments are executable without these detailed specific matters. hereinafter, some embodiments of the stabilizer will be described with reference to the attached drawings. In the following description, an example that the motion reduction target is a ship will be described. However, the motion reduction target may be a gondola supported movably by a supporting material.

(Definition of the Coordinate System)

Figure 1:
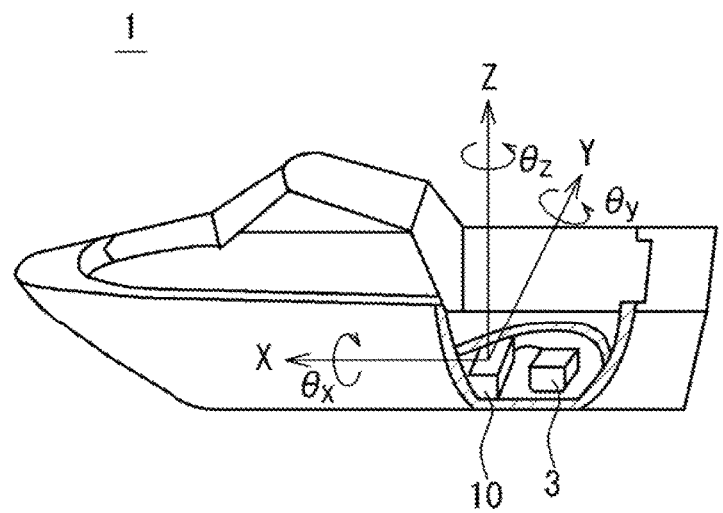
FIG. 1 is a perspective view schematically showing a ship in some embodiments.

Referring to FIG. 1, the coordinate system is defined. One motion axis of a ship (motion reduction target) is defined as an "X axis". In an example shown in FIG. 1, the X is a roll axis, i.e. an axis parallel to the longitudinal direction of the ship. A rotation axis of a gimbal of a stabilizer 10 is defined as a "Y axis". The Y axis is orthogonal to the X axis. In the example shown in FIG. 1, the Y axis is an axis parallel to the direction of a beam. An axis orthogonal to the X axis and the Y axis is defined as a "Z axis".

(Definition of Terms)

In this Specification, an "active type" means a type in which a control target is controlled by using a state quantity measuring sensor such as an angular velocity sensor and processing unit. For example, in Patent Literature 2, excitation current (control target) is controlled by using an angular velocity sensor (state quantity measuring sensor) and an electromagnetic brake controller (processing unit). Therefore, it is possible to say that an "electromagnetic brake" in Patent Literature 2 is an "active-type electromagnetism brake". On the other hand, in this Specification, a "passive-type" means a type except for the active-type. In the "passive type", at least one of the "state quantity measuring sensor" and the "processing unit" is unnecessary (typically, both the unnecessary). A "passive-type damper mechanism" includes, for example, a damper mechanism of a type having no configuration in which a damper characteristic is controlled in response to a control signal from the processing unit (control device), and a damper mechanism of a type in which the control of a damper characteristic is mechanically automatically carried out without using the processing unit.

In this Specification, a "rotation" includes a "motion" such as a swing motion around a predetermined axis.

Next, referring to FIG. 1 to FIG. 8, the stabilizer in some embodiments will be described.

FIG. 1 is a perspective view schematically showing a ship 1. A stabilizer 10 in the embodiments is installed in the ship 1 as a motion reduction target and is electrically connected with a power supply device 3. The power supply device 3 supplies the electric power to the stabilizer 10. The stabilizer 10 drives a motor and so on to be described later by using the electric power supplied from the power supply device 3.

Figure 2:
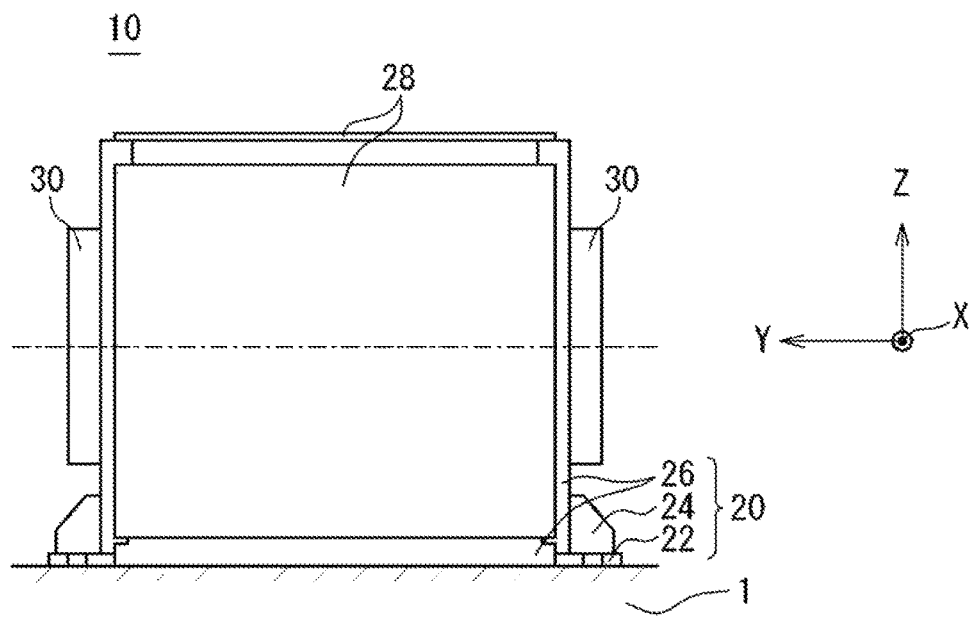
FIG. 2 is a front view schematically showing a stabilizer in some embodiments.

FIG. 2 is a front view schematically showing the stabilizer 10. That is, FIG. 2 is the front view of the stabilizer 10 when seeing the stabilizer 10 in the direction from the positive side of the X axis in FIG. 1 to the negative side thereof. The stabilizer 10 has a base 20 fixed on the floor surface of the ship 1. The base 20 has, for example, a mounting bracket 22 having a bolt hole and so on, a bracket 24, a frame 26, and so on. In an example shown in FIG. 2, a cover member 28 is installed to the frame 26 to cover the gimbal to be described layer. Also, in the example shown in FIG. 2, a damper mechanism 30 is disposed so that at least a part of the damper mechanism 30 is exposed from the frame 26 and the cover member 28. Alternately, the whole of damper mechanism 30 may be arranged inside the frame 26 or the cover member 28.

Figure 3:
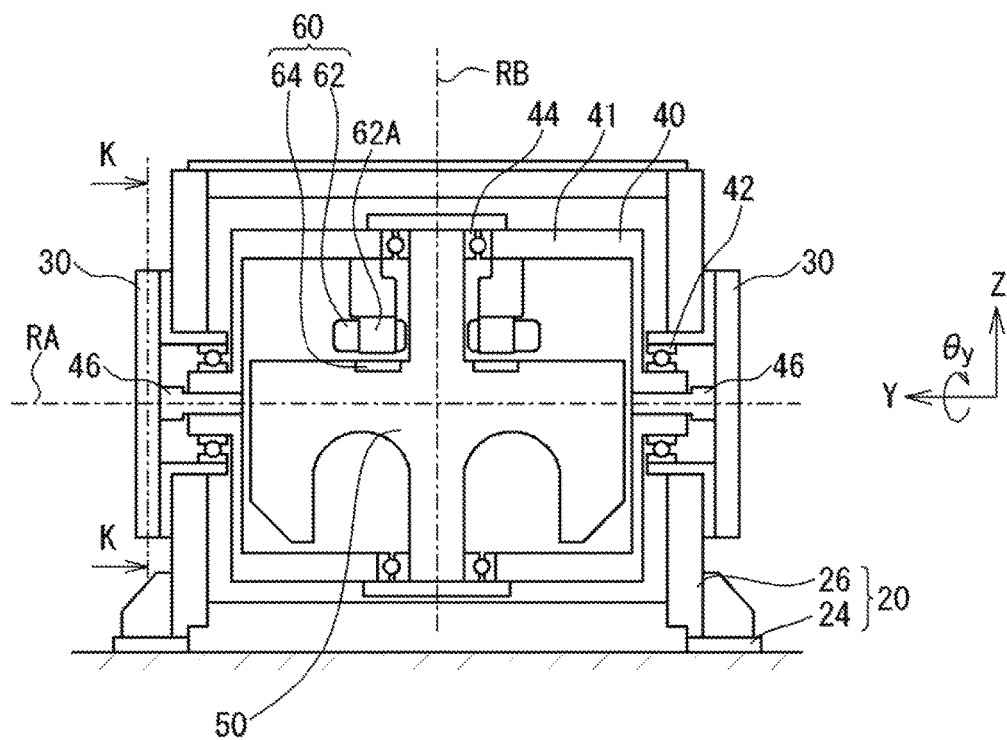
FIG. 3 is a sectional view schematically showing the stabilizer in the some embodiments.

FIG. 3 is a schematic sectional view (sectional view in the YZ plane) of the stabilizer 10. Note that although the X axis is not illustrated in FIG. 3, the X axis passes through an intersection point of the first axis RA and the second axis RB to be described later. The stabilizer 10 includes a gimbal 40, a flywheel 50, and a motor 60 in addition to the base 20 and the damper mechanism 30.

The gimbal 40 is supported by the base 20 to be rotatable. More specifically, the gimbal 40 is supported by the base 20 to be relatively rotatable to the base 20 around the first axis RA as a rotation axis of the gimbal. In an example shown in FIG. 3, the first axis RA coincides with the Y axis. The relative rotation of the gimbal 40 to the base 20 is realized by arranging a plurality of first bearings 42 between the gimbal 40 and the base 20.

The gimbal 40 contains a flywheel 50. In other words, flywheel 50 configures a part of the gimbal 40. The flywheel 50 is supported by a frame structure 41 to be relatively rotatable around the second axis RB orthogonal to the first axis RA to the frame structure 41 of the gimbal 40. The relative rotation of the flywheel 50 to the frame structure 41 is realized by arranging a plurality of second bearings 44 between the frame structure 41 of the gimbal 40 and the flywheel 50.

A motor 60 gives rotation force around the second axis RB to the flywheel 50. The motor 60 has a stator 62 and a rotor 64. The stator 62 is fixed to the frame structure 41 of the gimbal 40. The stator 62 has a core section 62A with a coil, and the electric power is supplied to the coil from the above-mentioned power supply device 3. In an example shown in FIG. 3, the rotor 64 is fixed on the flywheel 50. The flywheel 50 relatively rotates to the frame structure 41 of the gimbal 40 based on the supply of electric power to the motor 60. For example, the rotations of the flywheel 50 are rotations of a constant angular velocity.

The damper mechanism 30 has a function to damp the angular velocity around the first axis RA of the gimbal 40 (i.e. the Y axis) (note that the angular velocity is $d\theta_y/dt$, defining the rotation angle of the gimbal 40 around the Y axis as $\theta_y$). Below, the "angular velocity (containing swing motion angular velocity)" is merely described as the "angular velocity". The damper mechanism 30 gives a resistance to the relative rotary motion between the base 20 and the gimbal 40. In some embodiments, the damping coefficient of the damper mechanism 30 increases according to the increase in the relative rotation velocity between the base 20 and the gimbal (details will be described later). Note that when the damping coefficient is large, the resistance to the relative rotary motion between the base 20 and the gimbal 40 becomes larger than the resistance in case that the damping coefficient is small.

In an example shown in FIG. 3, an axis member 46 of the gimbal 40 and a moving member of the damper mechanism 30 (e.g. a partition member 39 to be described later) are mechanically connected. Also, the base 20 and a fixation member of the damper mechanism 30 (e.g. a housing 32 to be described later) are mechanically connected. Thus, a resistance is given to the relative movement between the moving member of the damper mechanism 30 (the partition member 39) and the fixation member of the damper mechanism 30 (the housing 32). The details will be described later.

(What Recognized by the Inventors)

Next, the matters which have been recognized by the inventors will be described. First, the equation of motion around the Y axis of the gimbal 40 is considered. Supposing that the swing motion angle (rotation angle) around the X axis of the ship 1 is defined as $\phi_x$ and the angular velocity around the X axis of the ship 1 is defined as $d\phi_x/dt$, and supposing that the rotation angle around the Y axis of the gimbal 40 $\theta_y$ and the angular velocity around the Y axis of the gimbal 40 is defined as $d\theta_y/dt$, the equation of motion around the Y axis is shown by the equation (1). Note that the second term on the left side of the equation (1) indicates output torque $T_d$ by the damper mechanism 30 (the torque given to the gimbal 40 from the damper mechanism 30).

$$I_g \times \frac{d^2\theta_y}{dt^2} + D \times \frac{d\theta_y}{dt} + mg\varepsilon\sin\theta_y = H \times \frac{d\phi_x}{dt} \times \cos\theta_y \quad (1)$$

where:
$I_g$ is an inertia moment of the gimbal 40 around the Y axis,
D is a damping coefficient of the damper mechanism 30,
m is a summation of the mass of gimbal 40 and the mass of flywheel 50,
g is acceleration of gravity,
$\varepsilon$ is a distance between the center of gravity of the gimbal 40 and the first axis RA as the gimbal rotation axis (note that $\varepsilon$ takes a positive value when the center of gravity of the gimbal is located below the gimbal rotation axis), and H is angular momentum around the second axis RB of the flywheel 50.

In the equation (1), ignoring the first and third terms of the left side to be a very small quantity, balance in $\theta_y=0$ radians is shown by the following equation (2).

$$\frac{d\theta_y}{dt} = \frac{H}{D} \times \frac{d\phi_x}{dt} \quad (2)$$

Next, the output torque of the gimbal 40 will be considered. The stabilizer 10 converts the motion around the X axis of the ship into the angular velocity around the Y axis of the gimbal 40, and converts the angular velocity around the Y axis of the gimbal 40 into the motion reduction torque (output torque) around the X axis of the ship. When the output torque of the gimbal 40 (the output torque around the X axis) is defined as T, the output torque T is shown by the following equation (3).

$$T = -H \times \frac{d\theta_y}{dt} \quad (3)$$

When substituting the equation (2) into the equation (3), the following equation (4) is obtained.

$$T = -\frac{H^2}{D} \times \frac{d\phi_x}{dt} \quad (4)$$

Note that when the stabilizer 10 is rolling reduction apparatus (ARG (Anit Rolling Gyro)), the output torque T of the equation (4) is ARG output torque.

Referring to the equation (4), it could be understood that the the output torque T of the gimbal 40 around the Y axis becomes larger as the damping coefficient D of the damper mechanism 30 becomes smaller. From the above, it could be understood that it is effective to make the damping coefficient D of the damper mechanism 30 small in order to make the output torque T (the motion reduction torque) of the stabilizer 10 large.

However, from the viewpoint of design, it is difficult to make the damping coefficient D small unlimitedly. Hereinafter, it will be described in detail with reference to FIG. 4.

Figure 4:
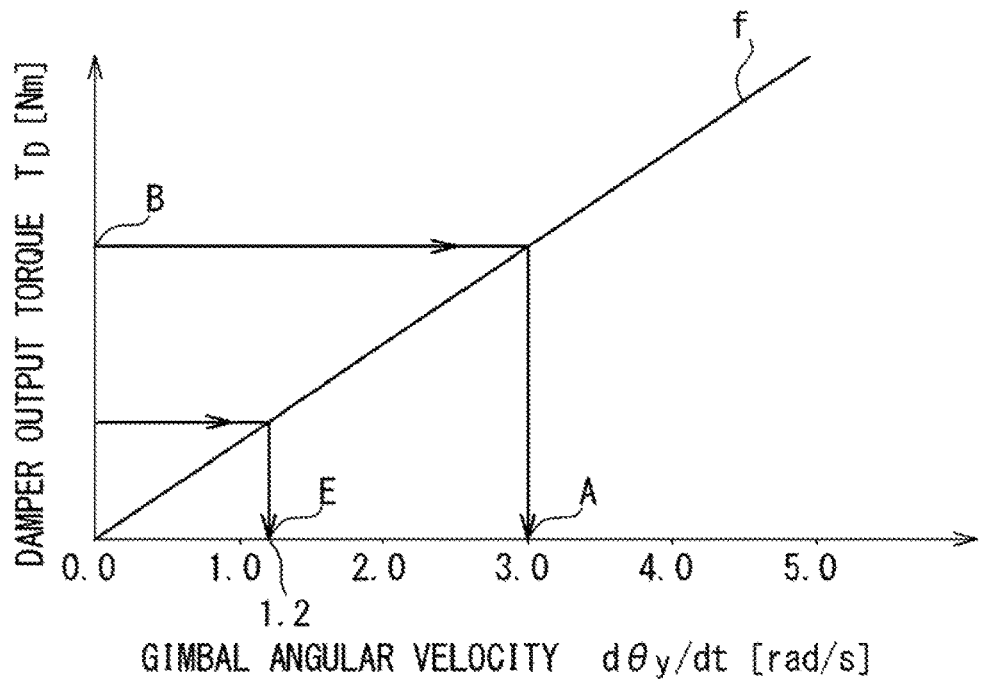
FIG. 4 is a graph of a function showing a relation between the angular velocity of a gimbal and the damper output torque in a linear damper of a comparative example.

FIG. 4 is a graph of the function $T_D=f(d\theta_y/dt)$ showing a relation between the angular velocity $d\theta_y/dt$ (radian per second) of the gimbal and the damper output torque $T_D$ in a linear damper. Note that the linear damper means a damper in which the damping coefficient D is constant without depending on the angular velocity of the gimbal. Note that the damping coefficient D corresponds to the inclination of the function shown in FIG. 4.

The maximum value A of the angular velocity $d\theta_y/dt$ of the gimbal (3.0 radians per second in an example shown in FIG. 4) is determined considering a value B of the damper output torque corresponding to the maximum motion angular velocity around the X axis of the ship assumed when the wave height is high, from the viewpoint of design. Considering the relation of the maximum value A and the value B of the damper output torque, the damping coefficient D (the inclination of the function f) is determined. Therefore, the damping coefficient D cannot be unlimitedly made small. Especially, in the example shown in FIG. 4, since the damping coefficient D (the inclination of the function f) is constant, the value $E=d\theta_y/dt$ of the angular velocity of the gimbal is limited to a small value when the wave height is low. As a result, when the wave height is low, the output torque T of the stabilizer 10 cannot be made large (reference to the equation (3)). For example, in a typical leisure boat, since it is not possible to make the output torque T (the motion reduction torque) of the stabilizer 10 large when the wave height is low, there is a fear that crews feel uncomfortable at the normal time when the wave height is low.

Therefore, the inventors conceived the use of a non-linear damper (the damper in which the damping coefficient D changes depending on the angular velocity of the gimbal) as the damper mechanism 30.

Figure 5:
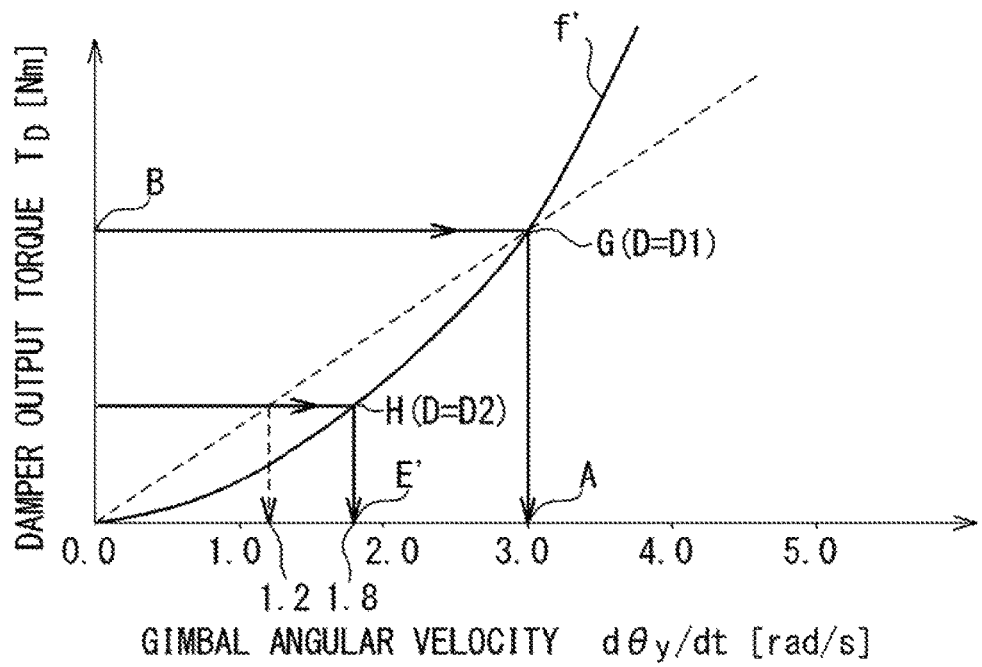
FIG. 5 is a graph of a function showing a relation between the angular velocity of the gimbal and the damper output torque in a non-linear damper in some embodiments.

FIG. 5 relates to an example of the non-linear damper and is a graph of the function f' showing a relation between the angular velocity $d\theta_y/dt$ (radian per second) of the gimbal and the damper output torque $T_D$. It is same as the example shown in FIG. 4 that the damping coefficient D of the damper when the angular velocity of the gimbal takes the maximum value A is determined, considering the maximum value A (3.0 radians per second in the example shown in FIG. 5) of the angular velocity $d\theta_y/dt$ of the gimbal and the value B of the damper output torque corresponding to the maximum motion angular velocity around the X axis of the ship assumed when the wave height is high. In the example shown in FIG. 5, the value D1 of the damping coefficient D (the inclination of the function f' at a point G) when the angular velocity of the gimbal is a first angular velocity (e.g. the maximum value A) is larger than the value D2 of the damping coefficient D (the inclination of the function f' at a point H) when the angular velocity of the gimbal is a second angular velocity (for example, the value E' of the second angular velocity E'=1.8) which is smaller than the first angular velocity. Therefore, the value E' of the angular velocity of the gimbal when the wave height is low, $E'=d\theta_y/dt=1.8$ takes a larger value than the value E=1.2 of the angular velocity of the gimbal in the example shown in FIG. 4. As a result, when the wave height is low, the output torque T of the stabilizer 10 can be made large (reference to the equation (3)).

For example, in the typical leisure boat, since the output torque T (the motion reduction torque) of the stabilizer 10 can be made large when the wave height is low, the crews can feel comfortable at the normal time when the wave height is low. Thus, it is desirable that the damper characteristic as shown in FIG. 5 is achieved.

Note that in the example shown in FIG. 5, the value D1 of the damping coefficient D (the inclination of the function f' at the point G) when the angular velocity of the gimbal is the first angular velocity is larger than 1.0 time of the value D2 of the damping coefficient D when the angular velocity of the gimbal is the second angular velocity which is smaller than the first angular velocity (the inclination of the function f' at the point H). For example, the value D1 of the damping coefficient D when the angular velocity of the gimbal is the first angular velocity may b 1.1 or more times, 1.5 or more times, or 1.8 or more times larger than the value D2 of the damping coefficient D when the angular velocity of the gimbal is the second angular velocity which is smaller than the first angular velocity. Note that the maximum value of the value of D1/D2 is optional (for example, the maximum value of the value of D1/D2 may be an optional value equal to or less than 10).

As an example, when the first angular velocity is set as the maximum permission angular velocity in case of design on the gimbal, and the second angular velocity is set to $\frac{3}{5}$ of the maximum permission angular velocity, the motion reduction effect at the normal time when the wave height is low is larger than the motion reduction effect when the linear damper is used, if the value D1 of the damping coefficient D at the time of the first angular velocity is larger than 1.0 time of the value D2 of the damping coefficient D at time of the second angular velocity. When the first angular velocity is set as the maximum permission angular velocity in the case of design of the gimbal, and the second angular velocity is set to ⅗ of the maximum permission angular velocity, the motion reduction effect at the normal time when the wave height is low is remarkably larger than the motion reduction effect when the linear damper is used, if the value D1 of the damping coefficient D at the time of the first angular velocity is 1.1 time or more, 1.5 times or more, or 1.8 times or more larger than the value D2 of the damping coefficient D at time of the second angular velocity.

As an alternative example, when the function f' can be approximated by a quadratic function, the value of the damping coefficient D when the angular velocity of the gimbal becomes 5/3 times (of the given second angular velocity) may be 1.1 time or more, 1.5 times or more, or 1.8 times or more larger than the value of the damping coefficient at the time of the given second angular velocity.

(Configuration of Damper)

Figure 6:
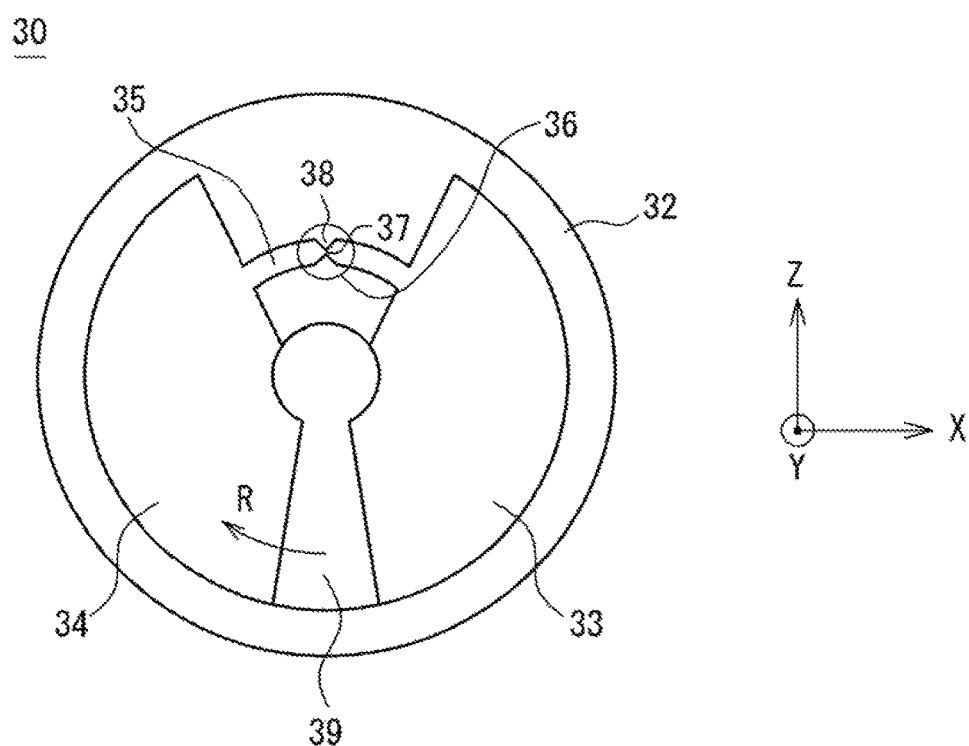
FIG. 6 is a sectional view of the stabilizer of FIG. 3 along a K-K line.

Next, the configuration of the damper mechanism 30 to achieve the damper characteristic as shown in FIG. 5 will be considered. As an example, it is assumed that the damper mechanism 30 contains a liquid damper (e.g. an oil damper). FIG. 6 is a sectional view of the damper mechanism 30 along the K-K line in FIG. 3. The damper mechanism 30 includes a housing 32, a partition member 39 (for example, a partition wall), a first liquid chamber 33, a second liquid chamber 34 and a passage 35.

In the examples shown in FIG. 3 and FIG. 6 the housing 32 is a fixed member which is impossible to relatively move to the base 20. Also, the partition member 39 is a movable member which is possible to relatively move to the base 20. In the examples shown in FIG. 3 and FIG. 6, the housing 32 is fixed on the base 20 and the partition member 39 is fixed on the gimbal 40.

The internal space of the housing 32 is divided into a first liquid chamber 33 and a second liquid chamber 34 by the partition member 39. Liquid (e.g. oil) is housed in the first liquid chamber 33 and the second liquid chamber 34. The partition member 39 is arranged between the first liquid chamber 33 and the second liquid chamber 34 and is relative rotatable to the housing 32. Note that the rotation axis of the partition member 39 is coaxial with the first axis RA in FIG. 3.

The passage 35 is connecting the first liquid chamber 33 and the second liquid chamber 34. In an example shown in FIG. 6, the passage 35 is formed in the housing 32. Alternatively, the passage 35 may be formed in the partition member 39. In the example shown in FIG. 6, when the partition member 39 rotates to the R direction, a part of the liquid in the second liquid chamber 34 moves to the first liquid chamber 33 through the passage 35. On the other hand, when the partition member 39 rotates to a direction opposite to the R direction, a part of the liquid in the first liquid chamber 33 moves to the second liquid chamber 34 through the passage 35. Since the cross-sectional area of the passage 35 is small in addition to the viscosity of the liquid flowing through the passage 35, the damper mechanism 30 functions as a liquid damper.

In the example shown in FIG. 6, an orifice section 36 is provided for the passage 35. In the example shown in FIG. 6, although the number of orifice sections 36 is one, the number of orifice sections may be equal to or more than two. In the orifice section 36, a part of the passage having the cross-sectional area smaller than the other part of the passage 35, namely, a narrow width section 37 is provided. Note that the passage cross-sectional area is an area of the passage cross section orthogonal to the longitudinal direction of the passage 35. Note that when the passage 35 is a curved passage, the longitudinal direction of the the passage means the tangent direction of the the passage in any position. For example, the narrow width section 37 is prescribed based on an annular protruding section 38 protruding for the passage 35. Note that when the cross-section of the passage 35 is circular, the annular protruding section 38 is a ring-like protruding section, and when the cross-section of the passage 35 is rectangular, the annular protruding section 38 is a protruding section having a rectangular frame. The material of the orifice section 36, especially, the material of the protruding section 38 is metal.

Figure 7A:
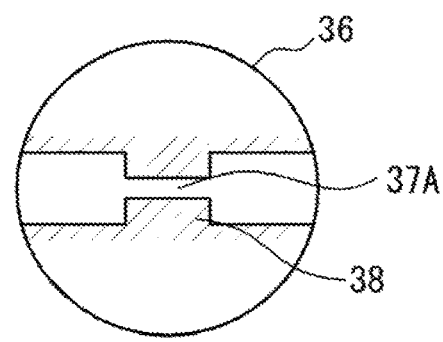
FIG. 7A is a longitudinal sectional view of an orifice section in a comparison example.
Figure 7B:
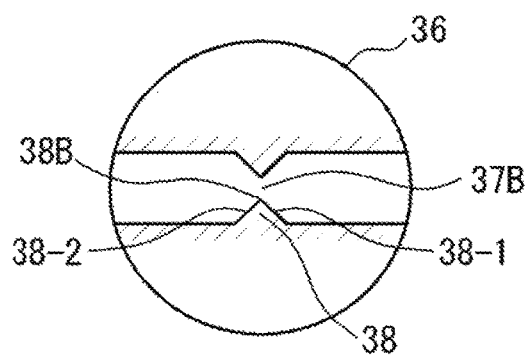
FIG. 7B is a longitudinal sectional view of the orifice section in some embodiments.
Figure 7C:
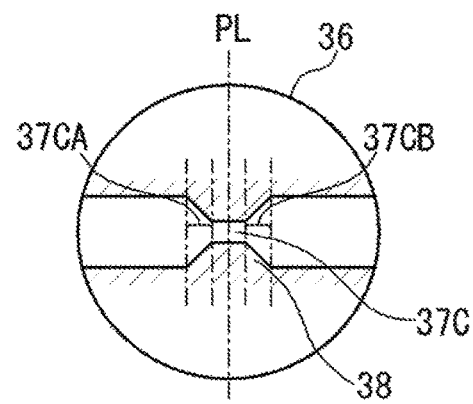
FIG. 7C is a longitudinal sectional view of the orifice section in some embodiments.

FIG. 7A to FIG. 7C are an expanded view of the orifice section 36 in FIG. 6. The orifice sections 36 shown in FIG. 7A to FIG. 7C are orifice sections of a fixation-type. In the fixation-type orifice section, there is no member or a part which moves to a member or part moving controlled by the control device, namely, a member in which the orifice section is installed (e.g. the housing 32) and which is moved through the control by the control device.

FIG. 7A shows the orifice section 36 in a comparison example. In the example shown in FIG. 7A, the passage cross-sectional area of the narrow width section 37A is constant. A flow rate Q of liquid which flows through the narrow width section 37A is proportional to the pressure difference P between the fluid pressure of the first liquid chamber 33 and the fluid pressure of the second liquid chamber 34 (Q=aP, a is a constant). Therefore, it is possible to say that the liquid damper is a linear damper, and the liquid damper does not show the damper characteristic shown in FIG. 5.

In an example shown in FIG. 7B, the passage cross-sectional area of the narrow width section 37B changes continuously along the longitudinal direction of the passage 35. More specifically, the first end of the protruding section 38 (an end on a side of the first liquid chamber 33) has a first inclination surface 38-1, and the second end of the protruding section 38 (an end on a side of the second liquid chamber) has a second inclination surface 38-2. The first inclination surface 38-1 is formed so that the passage cross-sectional area becomes smaller for the second end, and the second inclination surface 38-2 is formed so that the passage cross-sectional area becomes smaller for the first end. Also, in the example shown in FIG. 7B, an annular edge section 38B is provided in a part of the passage 35 where the passage cross-sectional area orthogonal to the longitudinal direction of the passage 35 becomes the smallest. The flow rate Q of the liquid which flows through the narrow width section 37B is almost proportional to a square root of the pressure difference P between the fluid pressure of the first liquid chamber 33 and the fluid pressure of the second liquid chamber 34 ($Q^2=bP$, b is a constant). For this reasons, it is possible to say that the liquid damper is a non-linear damper, and the liquid damper shows the damper characteristic shown in FIG. 5.

In an example shown in FIG. 7C, the passage cross-sectional area in a narrow width section 37C changes continuously along the longitudinal direction of the passage 35 at a first end 37CA and a second end 37CB in the narrow width section 37C at least. Note that in the example shown in FIG. 7C, the shape of the protruding section 38 (or the narrow width section) has a symmetrical shape with respect to a central symmetry plane PL. The narrow width section 37C in the example shown in FIG. 7C has an intermediate function of the function of the narrow width section 37A in the example shown in FIG. 7A and the function of the narrow width section 37B in the example shown in FIG. 7B. Therefore, although the liquid damper is a non-linear damper, it provides the damper characteristic shown in FIG. 5.

Figure 7D:
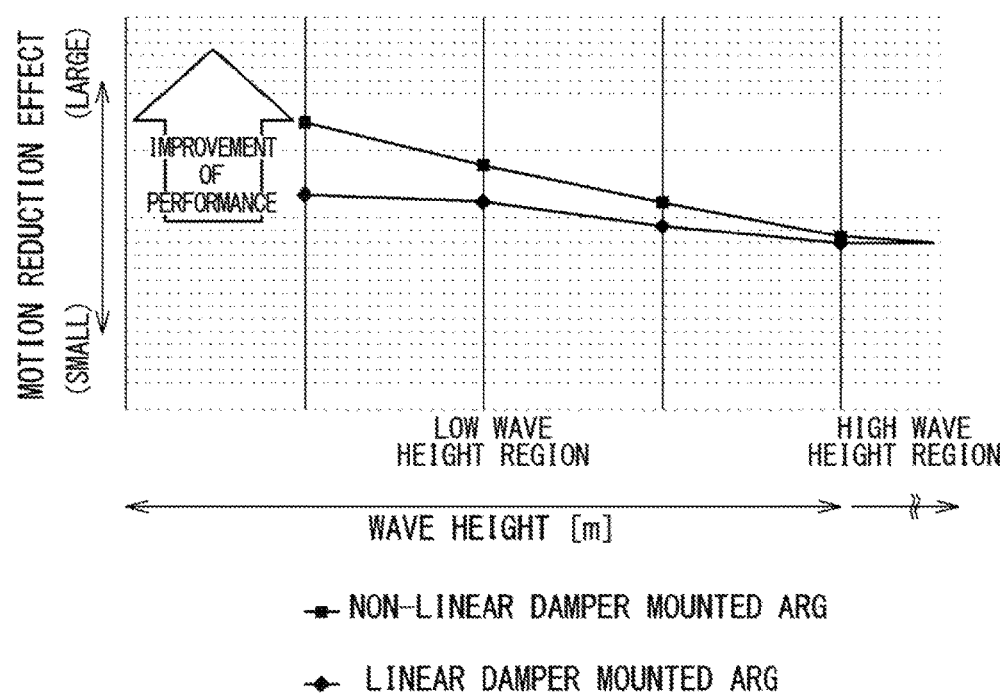
FIG. 7D is a graph schematically showing the motion reduction effect by the stabilizer in which the non-linear damper in some embodiments is installed, and the motion reduction effect by a stabilizer in which a linear damper in the comparison example is installed.

Therefore, the stabilizer 10 in which the damper mechanism 30 (the non-linear damper) shown in FIG. 7B or FIG. 7C is loaded, can be suitably damp the motion, even when the motion angular velocity of the ship 1 as the motion target (e.g. a motion angular velocity around the X axis) is small. Note that FIG. 7D shows graphs schematically showing the motion reduction effect by the stabilizer 10 in which the non-linear damper in the embodiment is loaded, and the motion reduction effect by the stabilizer in which the linear damper of a comparison example is loaded. Referring to FIG. 7D, in the stabilizer 10 which the non-linear damper in the embodiment is loaded, it could be understood that the motion reduction effect is large in the low wave height region.

Additionally, the characteristic of the non-linear damper having the orifice section 36 shown in FIG. 7B or FIG. 7C is difficult to undergo influence of viscosity of the liquid (oil) housed in the first liquid chamber 33 and the second liquid chamber 34. Therefore, the change of the damper output torque is small to the temperature change of the damper or the temperature change around the damper. Thus, it is possible to acquire the stable gimbal angular velocity ($d\theta_y/dt$) to the motion angular velocity (input) of the ship. That is, in the example shown in FIG. 7B or FIG. 7C, there is no case that the damping coefficient becomes small excessively with the damper temperature rising (oil viscosity lowering). As a result, the generation of the situation that the gimbal angular velocity exceeds a limitation value by making the damping coefficient small excessively, is restrained, and the stabilizer 10 is not damaged.

Figure 8:
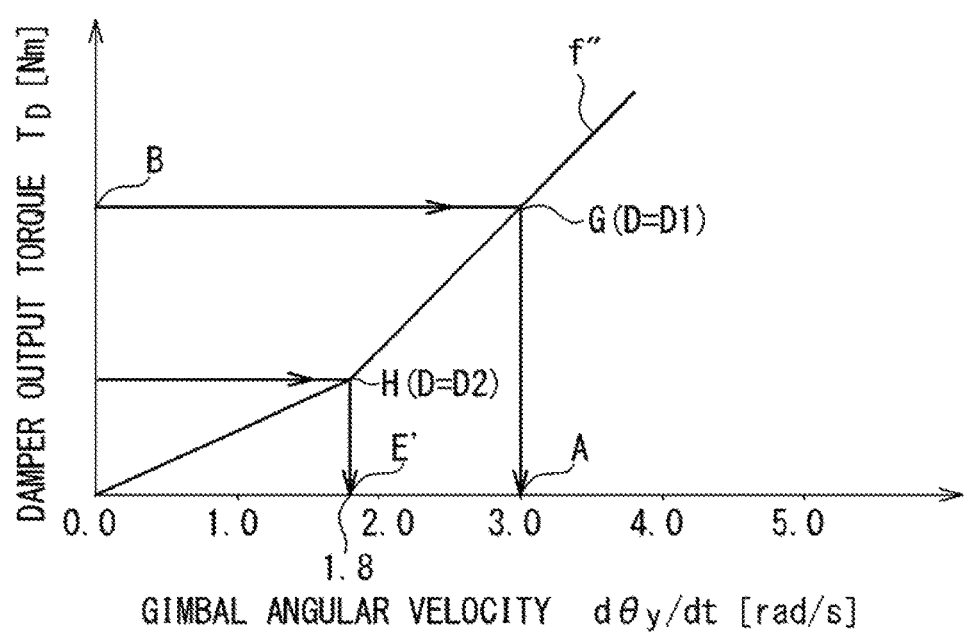
FIG. 8 is a graph of a function showing a relation between angular velocity of a gimbal and damper output torque in the non-linear damper in some embodiments.

Note that the damper mechanism 30 may have the damper characteristic shown in FIG. 8 instead of the damper characteristic shown in FIG. 5. In an example shown in FIG. 8, also, a value D1 of the damping coefficient D (the inclination of a function f'' at a point G) when the angular velocity of the gimbal 40 is a first angular velocity (e.g. maximum value A) is larger than a value D2 of the damping coefficient D (the inclination of a function f' at a point H) when the angular velocity of the gimbal 40 is a second angular velocity which is smaller than the first angular velocity. Therefore, a value E' of the angular velocity of the gimbal $E'=d\theta_y/dt=1.8$ when the wave height is low take a large value, compared with a value E of the angular velocity of the gimbal in the example shown in FIG. 4. As a result, when the wave height is low, the output torque of the stabilizer 10 can be made large (reference to the equation (3)).

The damper characteristic shown in FIG. 5 and the damper characteristic shown in FIG. 8 are common in a point that a value of the damping coefficient D (the inclination of the function f' or the inclination of the function f'') monotonously increases (in the wider sense) as the angular velocity of the gimbal increases. In this case, "the wide sense" means that a portion where the value of the damping coefficient D of the gimbal is constant to the increase of the angular velocity of the gimbal (a portion where the inclination of the function f'' is constant) may be contained.

Note that the damper characteristic shown in FIG. 8 can be realized by, for example, adopting a mechanically adjusted orifice section (a mobile-type orifice section) so that the minimum cross-sectional area of the narrow width section 37 changes step-by-step (into at least 2 steps) according to the pressure difference P between the fluid pressure in the first liquid chamber 33 and the fluid pressure in the second liquid chamber 34. Since such a mechanism is feasible by a skilled person, the detailed explanation is omitted. Alternatively, or additionally, a manual input device which can change the damper damping coefficient D step-by-step (into at least 2 steps) may be disposed.

Note that in order to realize the damper characteristic as shown in FIG. 5 or FIG. 8, it could be thought to actively control the damper characteristic by using a sensor for detecting the motion angular velocity of the ship and a processing unit for inputting a signal from the sensor and outputting a control signal to change the damper characteristic. The damper mechanism of such a type is defined as an active-type damper mechanism in this Specification. The active-type damper mechanism has a problem that a control mechanism requires many components. Also, when adopting the active-type damper mechanism, there is a possibility that the stabilizer oscillates in case of occurrence of a failure. Moreover, the control mechanism needs to have a high waterproof characteristic since the input and output of the electric signals are used. On the other hand, the damper mechanisms of some embodiments are the passive-type damper mechanisms (the damper mechanisms except the active type) and the stabilizer never oscillates, even when the failure occurs. Also, the passive-type damper mechanisms in the some embodiments are desirable from the view point of the water proof property since it can be realized without using an electric processing unit (the control unit).

The present invention is not limited to each of the above embodiments, and it would be apparent that each embodiment may be changed or modified appropriately in a range of the technical thought of the present invention. Also, various techniques used in each embodiment or the modification example are possible to apply to the other embodiments or modification examples, unless the technical contradiction occurs.

This application is based on Japan patent application No. 2015-136531 filed on Jul. 7, 2015 and claims a priority of the patent application. The disclosure of the patent application is incorporated herein by reference.

The invention claimed is:
1. A stabilizer comprising:
a base fixed on a motion reduction target;
a gimbal supported by the base to be rotatable around a first axis;
a damper mechanism disposed to damp a relative rotary motion of the gimbal to the base;
a flywheel configuring a part of the gimbal and disposed to be rotatable around a second axis orthogonal to the first axis; and
a motor configured to rotate the flywheel,
wherein the damper mechanism is a passive-type damper mechanism, and
wherein a first value of a damping coefficient of the damper mechanism when an angular velocity of the gimbal is a first angular velocity is larger than a second value of the damping coefficient of the damper mechanism when the angular velocity of the gimbal is a second angular velocity smaller than the first angular velocity.
2. The stabilizer according to claim 1, wherein the first value is 1.1 times or more as large as the second value.

3. The stabilizer according to claim 1, wherein any electric control signal is not inputted to the damper mechanism to change a characteristic of the damper mechanism.

4. The stabilizer according to claim 1, wherein the damper mechanism comprises:
- a housing;
- a first liquid chamber disposed in the housing;
- a second liquid chamber disposed in the housing;
- a partition member disposed between the first liquid chamber and the second liquid chamber to be relatively rotatable to the housing;
- a passage connecting the first liquid chamber and the second liquid chamber; and
- an orifice section disposed to define a minimum cross-sectional area of the passage, and
- wherein the shape of the orifice section is set such that the value of the damping coefficient increase as the angular velocity of the gimbal increases.

5. The stabilizer according to claim 4, wherein in at least a part of the orifice section, the passage cross-sectional area orthogonal to the longitudinal direction of the passage changes continuously along the longitudinal direction of the passage.

6. The stabilizer according to claim 4, wherein the orifice section has an annular edge section in a part where the passage cross-sectional area orthogonal to the longitudinal direction of the passage becomes minimum.

7. The stabilizer according to claim 4, wherein the orifice section is of a fixation-type.

8. A ship in which a stabilizer is installed,
wherein the stabilizer comprises:
- a base fixed on a motion reduction target;
- a gimbal supported by the base to be rotatable around a first axis;
- a damper mechanism disposed to damp a relative rotary motion of the gimbal to the base;
- a flywheel configuring a part of the gimbal and disposed to be rotatable around a second axis orthogonal to the first axis; and
- a motor configured to rotate the flywheel,
wherein the damper mechanism is a passive-type damper mechanism, and
wherein a first value of a damping coefficient of the damper mechanism when an angular velocity of the gimbal is a first angular velocity is larger than a second value of the damping coefficient of the damper mechanism when the angular velocity of the gimbal is a second angular velocity smaller than the first angular velocity.

* * * * *